Dec. 22, 1925.

A. KETCHAM 1,566,540

DUMPING BODY CONSTRUCTION

Filed March 24, 1924  2 Sheets-Sheet 1

Inventor
Alonzo Ketcham
By Frank E. Liviance, Jr.
Attorney

Dec. 22, 1925. 1,566,540

A. KETCHAM

DUMPING BODY CONSTRUCTION

Filed March 24, 1924 2 Sheets-Sheet 2

Inventor
Alonzo Ketcham
By Frank E. Liverance, Jr.
Attorney.

Patented Dec. 22, 1925.

1,566,540

UNITED STATES PATENT OFFICE.

ALONZO KETCHAM, OF DETROIT, MICHIGAN, ASSIGNOR TO WOOD HYDRAULIC HOIST AND BODY COMPANY, OF DETROIT, MICHIGAN, A CORPORATION OF MICHIGAN.

DUMPING-BODY CONSTRUCTION.

Application filed March 24, 1924. Serial No. 701,268.

*To all whom it may concern:*

Be it known that I, ALONZO KETCHAM, a citizen of the United States of America, residing at Detroit, in the county of Wayne and State of Michigan, have invented certain new and useful Improvements in Dumping-Body Constructions; and I do hereby declare the following to be a full, clear, and exact description of the invention, such as will enable others skilled in the art to which it appertains to make and use the same.

This invention relates to a truck body in which the essential novel feature resides in a combination tail gate and compartment which in itself is isolated from the body so that materials carried in the body and other materials in the compartment can not come into contact or mix with each other. This is particularly useful with bodies which are used for carrying sand, gravel, or other aggregate used in making concrete, the cement being carried in the separate tail gate compartment. By this means the inner sides of the body are kept from becoming coated with a cementitious coat as it would be should sand or gravel in a wet state together with the cement be placed in the body and not separated.

The present invention comprises many novel details of construction and arrangements and combinations of parts for effectively attaining the ends described as well as many others not at this time specifically stated, but which will appear fully and in detail as understanding of the invention is had from the following description taken in connection with the accompanying drawings in which, Fig. 1 is a fragmentary perspective view of the rear end of a truck body equipped with the tail gate compartment of my invention.

Like reference characters refer to like parts in the different views of the drawings.

Figure 3:
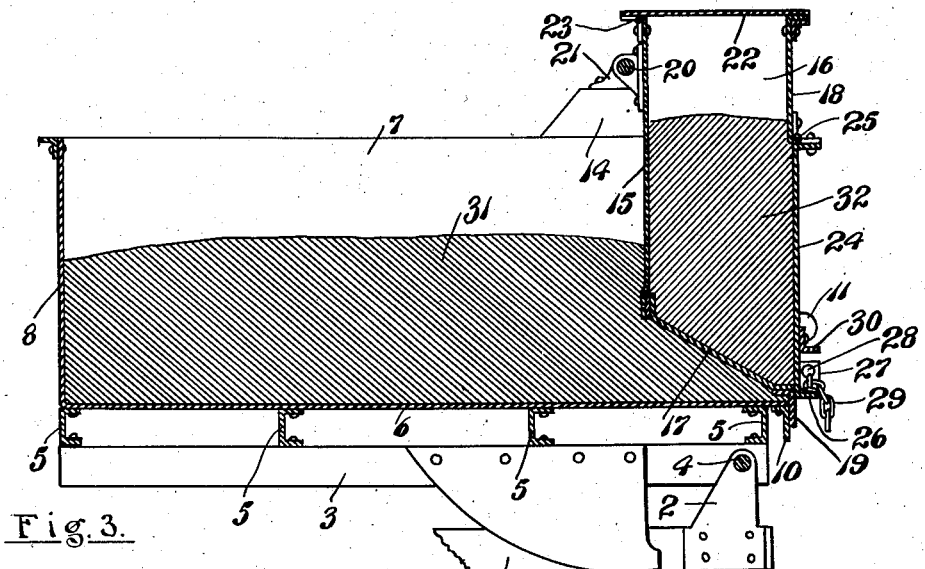
Fig. 3 is a longitudinal vertical section through a truck body with the tail gate compartment mounted thereon, the body being shown in horizontal position with the rear end closed.
Figure 4:
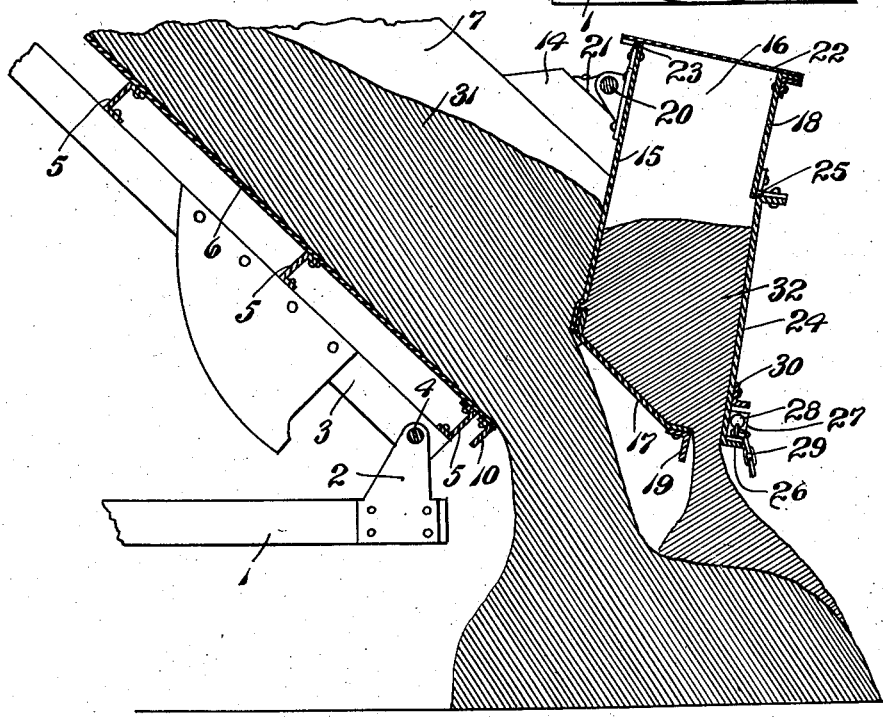
Fig. 4 is a fragmentary, longitudinal section showing the body elevated to dumping position and the contents of the body and of the tail gate compartment discharging.

Truck bodies of this character may be, and in many cases are, pivotally mounted adjacent their rear ends so that the same may be tilted upwardly for the discharge of their contents by gravity at the rear end of the body. As shown in Figs. 3 and 4, the chassis frame members 1 of the truck are equipped at their rear ends with suitable brackets 2 to which longitudinal bars 3 are pivotally mounted by means of a shaft 4 passing through the rear ends of the bars and the brackets. A number of transverse sills 5 lie above and are attached to the bars 3 serving as supports for the truck body.

Figure 1:
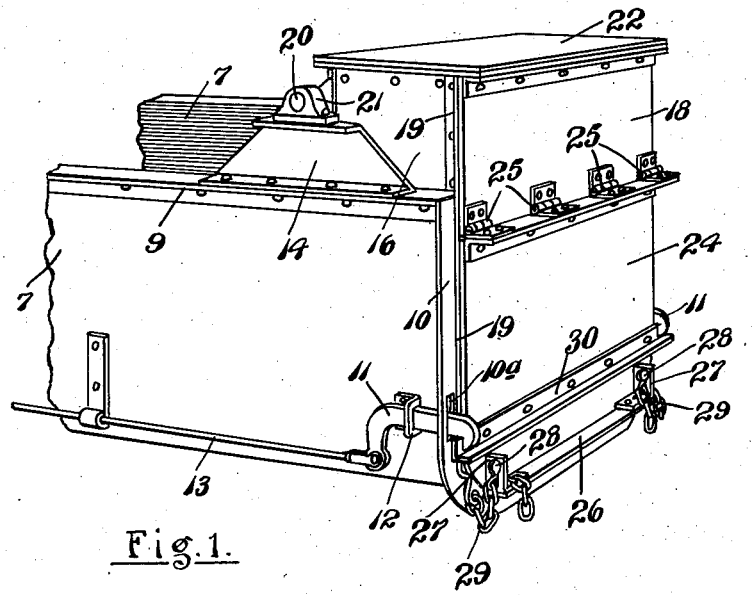
Figure 2:
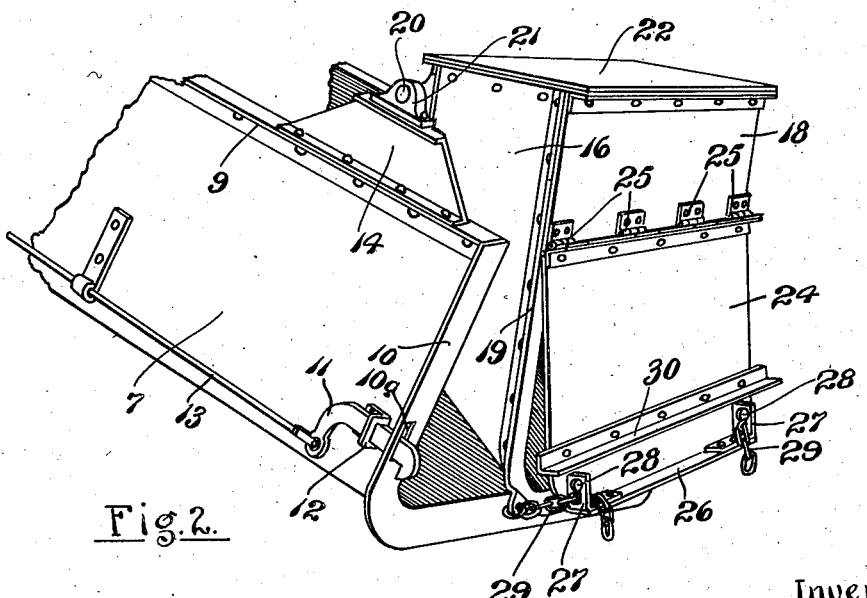
Fig. 2 is a like view showing the body elevated to dumping position with the tail gate compartment unlatched so as to permit dumping of the body contents and the door or closure to said compartment opened to permit discharge of the contents of the compartment.

The truck body is made of sheet metal with a bottom 6, sides 7 and a front 8, the rear end being open. The bottom, sides and front, preferably, are formed from a single piece of sheet metal and the sides and front end are reinforced at their upper edges by an angle bar 9 riveted thereto. The open rear end of the body is also strengthened and reinforced by a substantially U-shaped member 10 also of angle iron. Latches 11 are slidably mounted through suitable brackets 12 attached to sides 7 of the body, the latches also passing through slots 10ª which are cut through the legs of the rear reinforcing member 10. The latch is of an old and well-known construction and is opened by a rod 13 which leads to the front so as to be readily operated by the driver of the truck. At the upper side of each side 7 of the body and near the rear end thereof a supporting bracket 14 channel-shaped in cross section is permanently secured to the member 9 as shown in Figs. 1 and 2.

In the open rear end of the body the tail gate compartment of my invention is located. It comprises a front 15, two sides 16 extending to the rear, a bottom 17 which is inclined downwardly and to the rear, and a partial back 18 located between the rear edges and the upper portions of the sides 16. A reinforcing member 19 of angle iron extends around the compartment being located at the rear edge portions of the sides 16 and bottom 17 which in practice are preferably formed from a single piece of sheet metal; and in the closed position of the tail gate compartment, the outwardly projecting leg of the reinforcing member 19 comes against the outwardly projecting leg of the reinforcing member 10 attached to the body.

This tail gate compartment is of a width so as to readily pass between the sides 7 of the body but substantially filling the entire rear open end of the body. Trunnions 20 are attached to the front 15 and are pivotally mounted in suitable bearing blocks 21 fixed to the upper flanges of the bracket 14. A cover plate 22 is hinged at 23 to the front 15 and is used to normally close the upper end of the compartment.

A closure door 24 is hingedly connected by means of hinges 25 to the back member 18, depending therefrom so as to close the open rear side of the compartment below the back 18. The lower edge of the door 24 is turned outwardly at right angles as indicated at 26. Two angle brackets 27 are riveted to and lie above the part 26 each having a vertical leg in which a key-hole slot 28 is cut. Chains 29 are fastened to the member 19 and pass through these slots 28, it being evident that the free length of chain between its point of attachment to the member 19 and the brackets 27 may be readily adjusted as may be desired. A cross bar 30 of angle iron is riveted to the door 24 above the brackets 27 having ends extending beyond the vertical edges of the door so that the latches 11 may engage over the vertical legs of said bar 30 to hold the tail gate compartment in closed position and at the same time hold the door 24 closed.

With a body of this character equipped with a tail gate compartment as described sand, gravel, crushed stone, or other aggregate is placed in the body in front of the tail gate compartment, and the required amount of cement to be used therewith is placed in the compartment being introduced from above by opening the door 22. When the body is in horizontal position the tail gate compartment closes the rear end of the body and the door 24 to the compartment is also closed both being held in closed position by the latches 11 as heretofore described. In practice, particularly in the building of roads or where other large jobs of concrete mixing are done with mixing machines, the truck is backed up to the mixing machine in position such that the contents of the body may be discharged into the skip of the machine which, when receiving a load, lies flat on the ground. In operation the latch hooks 11 are first disengaged and the body elevated through any of the well-known means now used for that purpose. With the elevation of the body the tail gate compartment swings outwardly at its lower end permitting the aggregate to discharge from the body and at the same time the door 24 swings to the rear and permits the escape of the cement. Accordingly the aggregate and cement are simultaneously discharged, the cement spreading over the aggregate. All of the cement is discharged from the compartment and there is no possibility of any of it coming into contact with the inner sides of the body. The rate of discharge of the cement is regulated by the distance that the door 24 is permitted to open and this distance is taken care of by the chains 29 which may be adjusted to any one of a number of positions. The top or cover 22 to the compartment is not particularly essential though it may be desirable to have it. In practice, concreting is never done in the open in wet weather and except to exclude water the top 22 is not particularly useful.

This construction is relatively simple but is particularly practical and efficient for the purposes for which it is designed. The appended claims define the invention which is to be considered as comprehensive of all forms of construction coming within the scope of said claims.

I claim:

1. In combination with a truck body adapted to be tilted upwardly at its forward end and having an open rear end, of a closure for the rear end of the body comprising a receptacle having a front, sides and bottom located between the sides of the body at the rear end thereof, means for mounting said receptacle on the body to turn about a horizontal axis, and a movable closure to the back of said receptacle which may be opened to discharge the contents of the receptacle, said receptacle being adapted in one position to close the rear end of the body.

2. In combination with a truck body adapted to be tilted upwardly at its forward end and having an open rear end, of a receptacle mounted at the rear open end of the body to serve as a closure therefor, said receptacle being mounted to turn on a horizontal axis so as to swing outwardly at its lower portion when the body is tilted, and means movably mounted on the receptacle to form a closure at the rear lower portion thereof and adapted to be opened to discharge the contents of the receptacle.

3. In combintion with a tiltable truck body having an open rear end, of a receptacle positioned vertically in the rear end of the body, means for mounting the receptacle on a horizontal axis to turn with respect to the body, a movable closure for the receptacle at the back thereof, and means for latching the receptacle to the body in position for the receptacle to make a closure for the rear end of the body.

4. In combination with a tiltable truck body having an open rear end, of a receptacle positioned vertically at the rear end of the body to make a closure therefor, means for movably mounting the receptacle whereby it can be moved to open the rear end of the body for the discharge of the contents of the body, a movable closure to the receptacle, and a common means for holding the receptacle closure in closed position and the receptacle in body closing position.

5. In combination with a tiltable truck body having an open rear end, of a receptacle positioned vertically at the rear end of the body and between the sides thereof, said receptacle having a front, spaced sides, a bottom and an upper back portion permanently connected together and an open upper end, means for mounting the receptacle to turn about a horizontal axis positioned in front of the receptacle and above the upper edges of the sides of the body, and a rear closure to the receptacle comprising a plate hingedly connected at its upper edges to the lower edge of said permanent back portion, said rear closure extending downwardly so as to completely close the back of the receptacle.

6. In combination with a tiltable truck body having sides, bottom and front and an open rear end, said body being formed from metal, a reinforcing member at the open rear end of the body having an outwardly extending flange, a receptacle mounted at the rear end of the body between the sides thereof having a front, sides, bottom and a back portion between the upper portions and at the rear edges of the receptacle sides, a reinforcing member connected to and placed around the sides and bottom of the receptacle having an outwardly extending flange, means for mounting said receptacle on the body to turn on a horizontal axis, the flange on the reinforcing member on the receptacle coming against the like flange on the reinforcing member on the body, a door hingedly connected at its upper edge to the lower edge of said back portion, and latching means mounted on the body adapted to detachably engage with the door to hold it in closed position and hold the receptacle in position to close the rear end of the body.

7. In combination with a tiltable truck body having an open end, of a vertically positioned receptacle having an open upper end mounted at the rear end of the body to close the rear end thereof, and provided at its rear lower portion with a movable closure member, latching means on the body for holding the said closure member in closed position and hold the receptacle in position to close the open rear end of the body, said latching means being manually releasable whereby on tilting the body, the receptacle automatically swings outwardly at its lower end to allow discharge of the contents of the body, and the movable closure member moves to permit simultaneous discharge of the contents of the receptacle.

8. A construction containing the elements in combination defined in claim 7, combined with means for limiting the extent of opening movement of said movable closure member.

9. In combination with a tiltable truck body having an open rear end, a tail gate construction mounted to turn about a horizontal axis located above the upper edges of the sides of the body and including a receptacle adapted to be filled at its upper end, a depending hinged door closure to the rear lower portion of the said receptacle, and releasable means for holding the door closure in closed position and the said tail gate construction in position to close the rear end of the body.

10. In combination with a tiltable truck body having an open rear end, a tail gate construction mounted to turn about a horizontal axis located adjacent the upper edges of the body and including a receptacle adapted to be filled at its upper end, said receptacle having a discharge opening at its rear lower portion, and a depending hinged door closure to said discharge opening, said door moving to closed position and the tail gate construction moving to closed position to close the rear open end of the body when the body is in horizontal position.

In testimony whereof I affix my signature.

ALONZO KETCHAM.